United States Patent
Abuelsaad et al.

(10) Patent No.: US 9,479,398 B2
(45) Date of Patent: Oct. 25, 2016

(54) ENFORCING RUNTIME POLICIES IN A NETWORKED COMPUTING ENVIRONMENT

(71) Applicant: International Business Machines Corporation, Armonk, NY (US)

(72) Inventors: Kelly Abuelsaad, Somers, NY (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 13/934,338

(22) Filed: Jul. 3, 2013

(65) Prior Publication Data

US 2015/0012630 A1    Jan. 8, 2015

(51) Int. Cl.
G06F 15/173     (2006.01)
H04L 12/24      (2006.01)
H04W 12/08      (2009.01)
(Continued)

(52) U.S. Cl.
CPC ......... *H04L 41/0893* (2013.01); *G06F 21/121* (2013.01); *G06F 21/123* (2013.01); *G06F 21/6209* (2013.01); *H04W 12/08* (2013.01); *G06F 2221/2111* (2013.01); *H04L 41/5096* (2013.01); *H04L 63/20* (2013.01)

(58) Field of Classification Search
CPC ... H04L 41/00; H04L 41/0893; H04L 63/20; H04L 41/5096; H04L 12/24; G06F 21/121; G06F 21/123; G06F 21/6209; G06F 2221/2111; H04W 12/08
See application file for complete search history.

(56) References Cited

U.S. PATENT DOCUMENTS 6,427,234 B1 *  7/2002  Chambers ........... G06F 9/45516
                                                          717/140
7,584,458 B2    9/2009  Das et al.
(Continued)

FOREIGN PATENT DOCUMENTS

EP    1779062 A1    5/2007
EP    2229639 A1    9/2010
EP    2415237 A1    2/2012

OTHER PUBLICATIONS

Maitland, J., "Keeping Control Isn't Easy", Chapter 4, Cloud-Based Infrastructure, SearchCloudComputing.com, 13 pages.
(Continued)

*Primary Examiner* — Benjamin M Thieu
(74) *Attorney, Agent, or Firm* — Maeve M. Carpenter; Maxine L. Barasch; Keohane & D'Alessandro PLLC

(57) ABSTRACT

Embodiments of the present invention provide approaches for enforcing runtime policies in a networked computing environment (e.g., a cloud computing environment). Specifically, in a typical embodiment, computer code and data of an application is annotated with metadata defining a set of runtime policies for executing the computer code and data. Once a request is received to run the application, a set of parameters (e.g., geographic location) corresponding to the execution of the computer code and data of the application is dynamically determined, and compared to the runtime policies. The runtime policies for executing the computer code and data are then enforced at runtime. This includes either running the application, or preventing the running of the application in the case that the set of parameters corresponding to the execution of the computer code and data of the application do not satisfy the runtime policies.

17 Claims, 7 Drawing Sheets

(51) Int. Cl.
*G06F 21/12* (2013.01)
*G06F 21/62* (2013.01)
*H04L 29/06* (2006.01)

(56) References Cited

U.S. PATENT DOCUMENTS

| | | |
|---|---|---|
| 8,065,660 B1 | 11/2011 | Tanner et al. |
| 8,438,468 B2 | 5/2013 | Berg et al. |
| 2003/0233477 A1* | 12/2003 | Ballinger ................ G06F 9/547 709/246 |
| 2004/0044739 A1* | 3/2004 | Ziegler ................ G06Q 20/02 709/213 |
| 2007/0143851 A1* | 6/2007 | Nicodemus ............ G06F 21/55 726/25 |
| 2009/0093259 A1 | 4/2009 | Edge et al. |
| 2009/0112783 A1* | 4/2009 | Hargrave ................ G06F 9/542 706/46 |
| 2010/0151882 A1 | 6/2010 | Gillies et al. |
| 2012/0246731 A1* | 9/2012 | Blaisdell ................ G06F 21/54 726/26 |
| 2014/0208397 A1* | 7/2014 | Peterson ................ G06F 21/51 726/4 |

OTHER PUBLICATIONS

Mell, P. et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, Publication Date: Oct. 2009, 17 pages.

Annotation—Wikipedia, the free encyclopedia, "Annotation" Literature and education, https://en.wikipedia.org/wiki/Annotation#Java_annotations, printed Mar. 7, 2016, 4 pages.

DVD region code—Wikipedia, the free encyclopedia, "DVD region code", https://en.wikipedia.org/wiki/DVD_region_code, printed Mar. 7, 2016, 8 pages.

* cited by examiner

ENFORCING RUNTIME POLICIES IN A NETWORKED COMPUTING ENVIRONMENT

TECHNICAL FIELD

In general, embodiments of the present invention relate to application runtime management. Specifically, embodiments of the present invention relate to approaches for enforcing runtime policies in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Increasingly, there is a need in cloud and mobile computing to run application code in highly elastic dynamic infrastructures in which data flows across international boundaries easily. However, it has proven difficult to apply various application rules and regulations, at runtime, in the context that the application is executing. Therefore, what is needed is a solution to at least this deficiency.

SUMMARY

In general, embodiments of the present invention provide an approach for enforcing runtime policies in a networked computing environment (e.g., a cloud computing environment). Specifically, in a typical embodiment, computer code and data of an application is annotated with metadata defining a set of runtime policies for executing the computer code and data. Once a request is received to run the application, a set of parameters (e.g., geographic location) corresponding to the execution of the computer code and data of the application is dynamically determined, and compared to the runtime policies. The runtime policies for executing the computer code and data are then enforced at runtime. This includes either running the application, or preventing the running of the application in the case that the set of parameters corresponding to the execution of the computer code and data of the application do not satisfy the runtime policies. As such, embodiments herein are applicable to highly distributed applications that run in cloud computing environments in which the host environment or geographic location where the code and data may operate is not known in advance.

A first aspect of the present invention provides a computer-implemented method for enforcing runtime policies in a networked computing environment, comprising: annotating computer code and data of an application with metadata defining a set of runtime policies for executing the computer code and data; receiving a request to run the application; dynamically determining a set of parameters corresponding to the execution of the computer code and data of the application, wherein the set of parameters comprises a geographic location for executing the computer code and data; comparing the set of parameters corresponding to the execution of the computer code and data of the application with the set of runtime policies for executing the computer code and data; and enforcing, at a runtime of the application, the set of runtime policies for executing the computer code and data.

A second aspect of the present invention provides a system for enforcing runtime policies in a networked computing environment, comprising: a memory medium comprising instructions; a bus coupled to the memory medium; and a processor coupled to the bus that when executing the instructions causes the system to: annotate computer code and data of an application with metadata defining a set of runtime policies for executing the computer code and data; receive a request to run the application; dynamically determine a set of parameters corresponding to the execution of the computer code and data of the application, wherein the set of parameters comprises a geographic location for executing the computer code and data; compare the set of parameters corresponding to the execution of the computer code and data of the application with the set of runtime policies for executing the computer code and data; and enforce, at a runtime of the application, the set of runtime policies for executing the computer code and data.

A third aspect of the present invention provides a computer program product for enforcing runtime policies in a networked computing environment, the computer program product comprising a computer readable storage media, and program instructions stored on the computer readable storage media, to: annotate computer code and data of an application with metadata defining a set of runtime policies for executing the computer code and data; receive a request to run the application; dynamically determine a set of parameters corresponding to the execution of the computer code and data of the application, wherein the set of parameters comprises a geographic location for executing the computer code and data; compare the set of parameters corresponding to the execution of the computer code and data of the application with the set of runtime policies for executing the computer code and data; and enforce, at a runtime of the application, the set of runtime policies for executing the computer code and data.

A fourth aspect of the present invention provides a method for deploying a system for enforcing runtime policies in a networked computing environment, comprising: providing a computer infrastructure being operable to: annotate computer code and data of an application with metadata defining a set of runtime policies for executing the computer code and data; receive a request to run the application; dynamically determine a set of parameters corresponding to the execution of the computer code and data of the application, wherein the set of parameters comprises a geographic location for executing the computer code and data; compare the set of parameters corresponding to the execution of the computer code and data of the application with the set of runtime policies for executing the computer code and data; and enforce, at a runtime of the application, the set of runtime policies for executing the computer code and data.

BRIEF DESCRIPTION OF THE DRAWINGS

These and other features of this invention will be more readily understood from the following detailed description of the various aspects of the invention taken in conjunction with the accompanying drawings in which.

Figure 1:
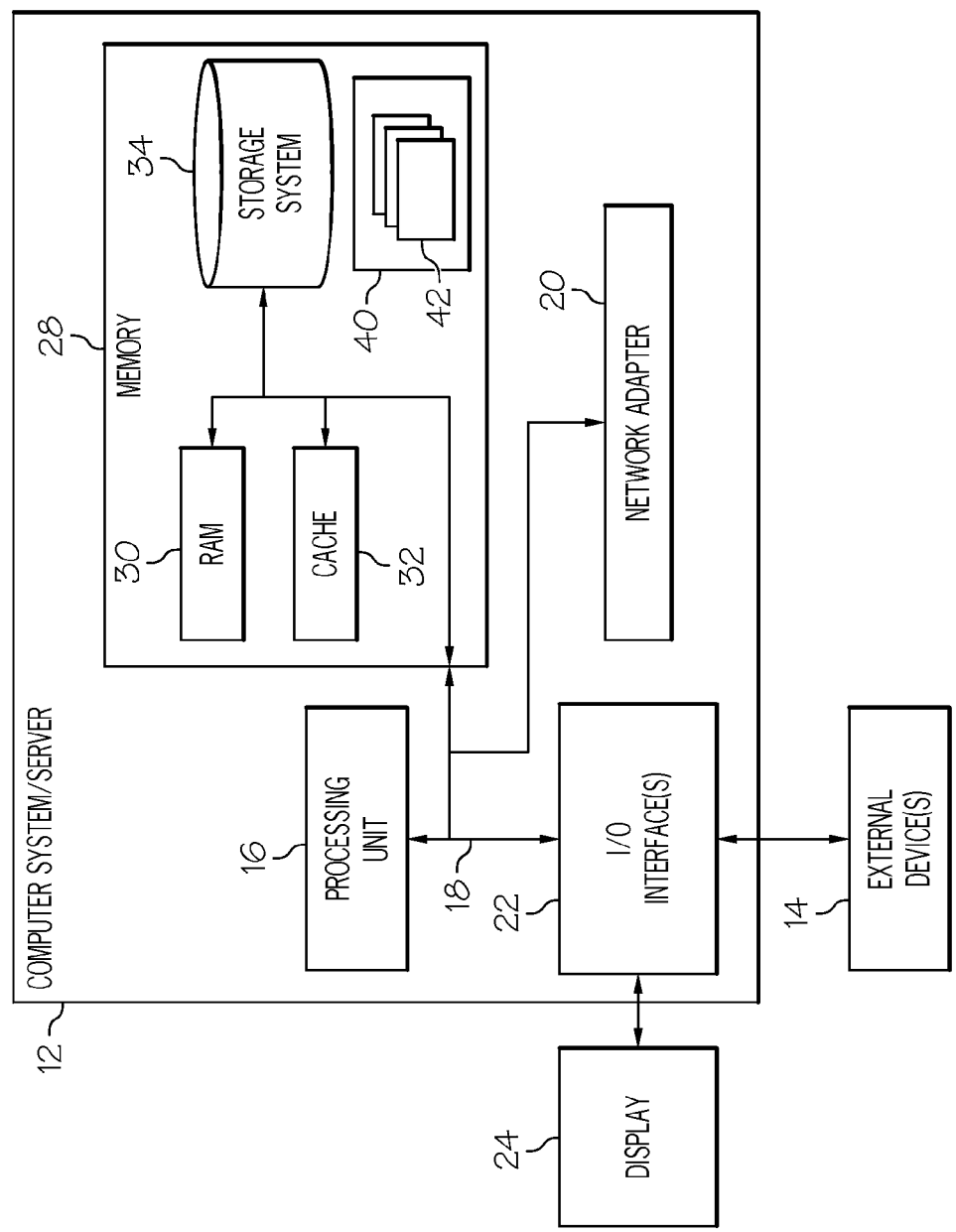
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for enforcing runtime policies in a networked computing environment (e.g., a cloud computing environment). Specifically, in a typical embodiment, computer code and data of an application is annotated with metadata defining a set of runtime policies for executing the computer code and data. Once a request is received to run the application, a set of parameters (e.g., geographic location) corresponding to the execution of the computer code and data of the application is dynamically determined, and compared to the runtime policies. The runtime policies for executing the computer code and data are then enforced at runtime. This includes either running the application, or preventing the running of the application in the case that the set of parameters corresponding to the execution of the computer code and data of the application do not satisfy the runtime policies. As such, embodiments herein are applicable to highly distributed applications that run in cloud computing environments in which the host environment or geographic location where the code and data may operate is not known in advance.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
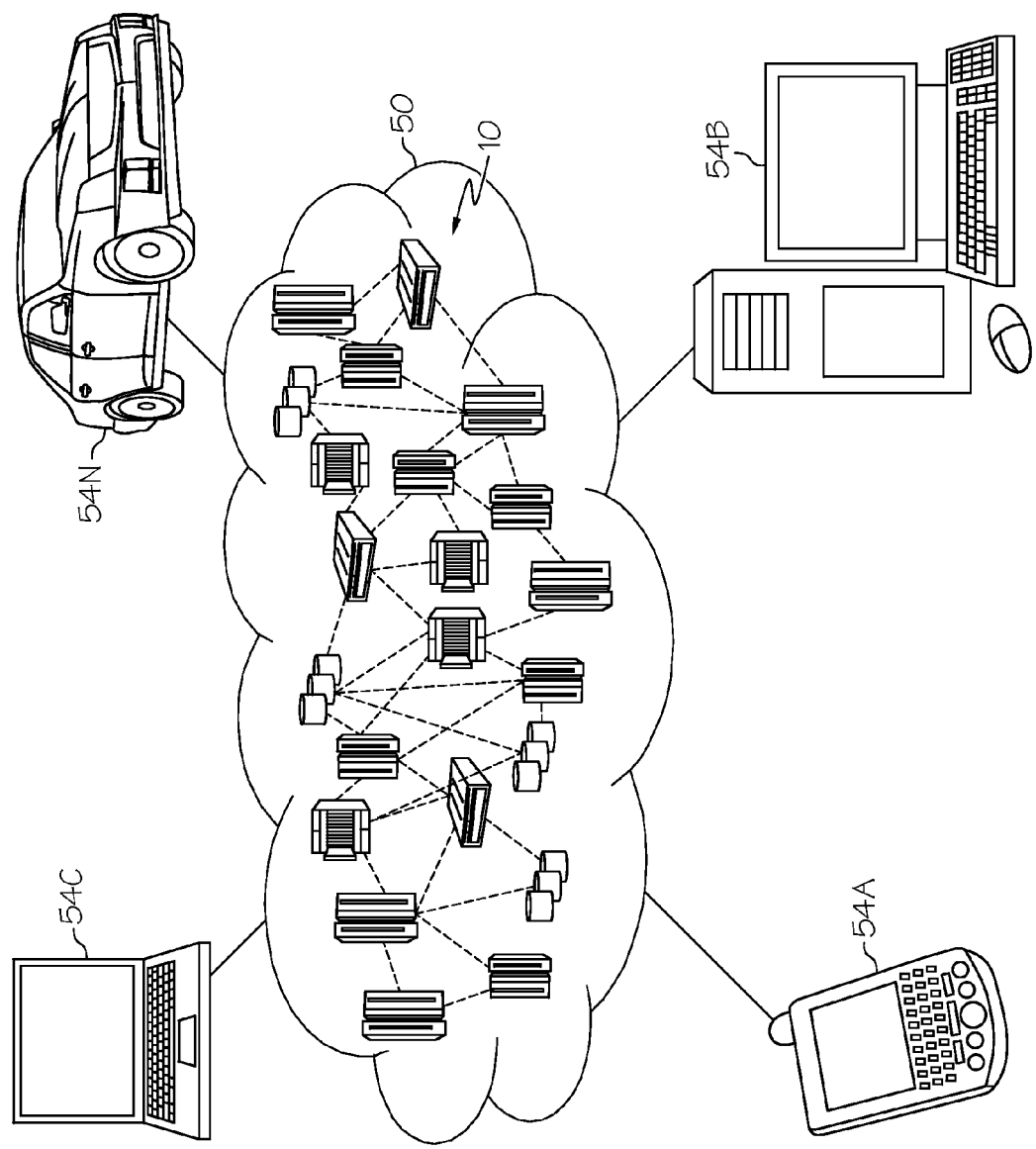
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
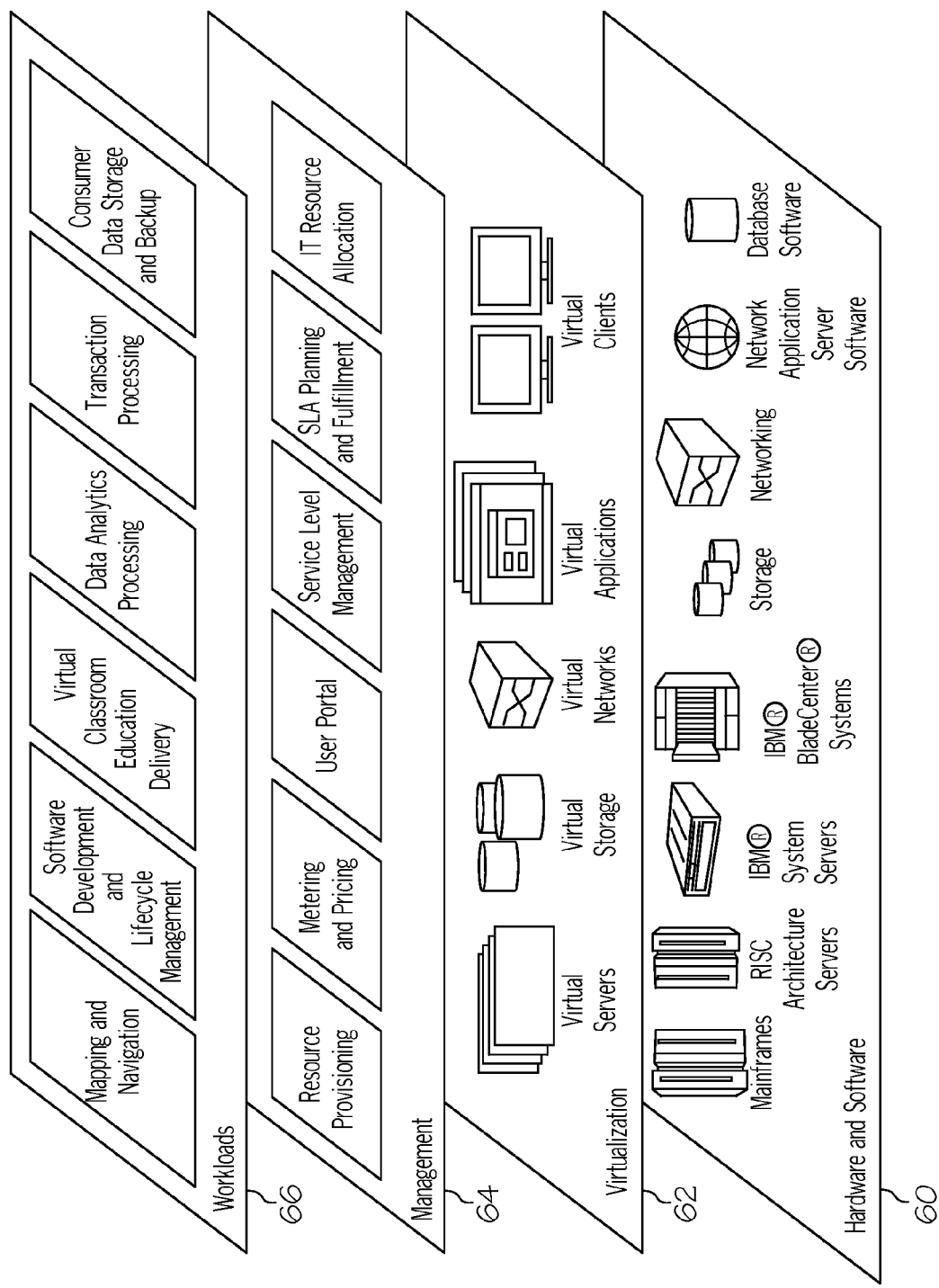
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is command identification, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the command identification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
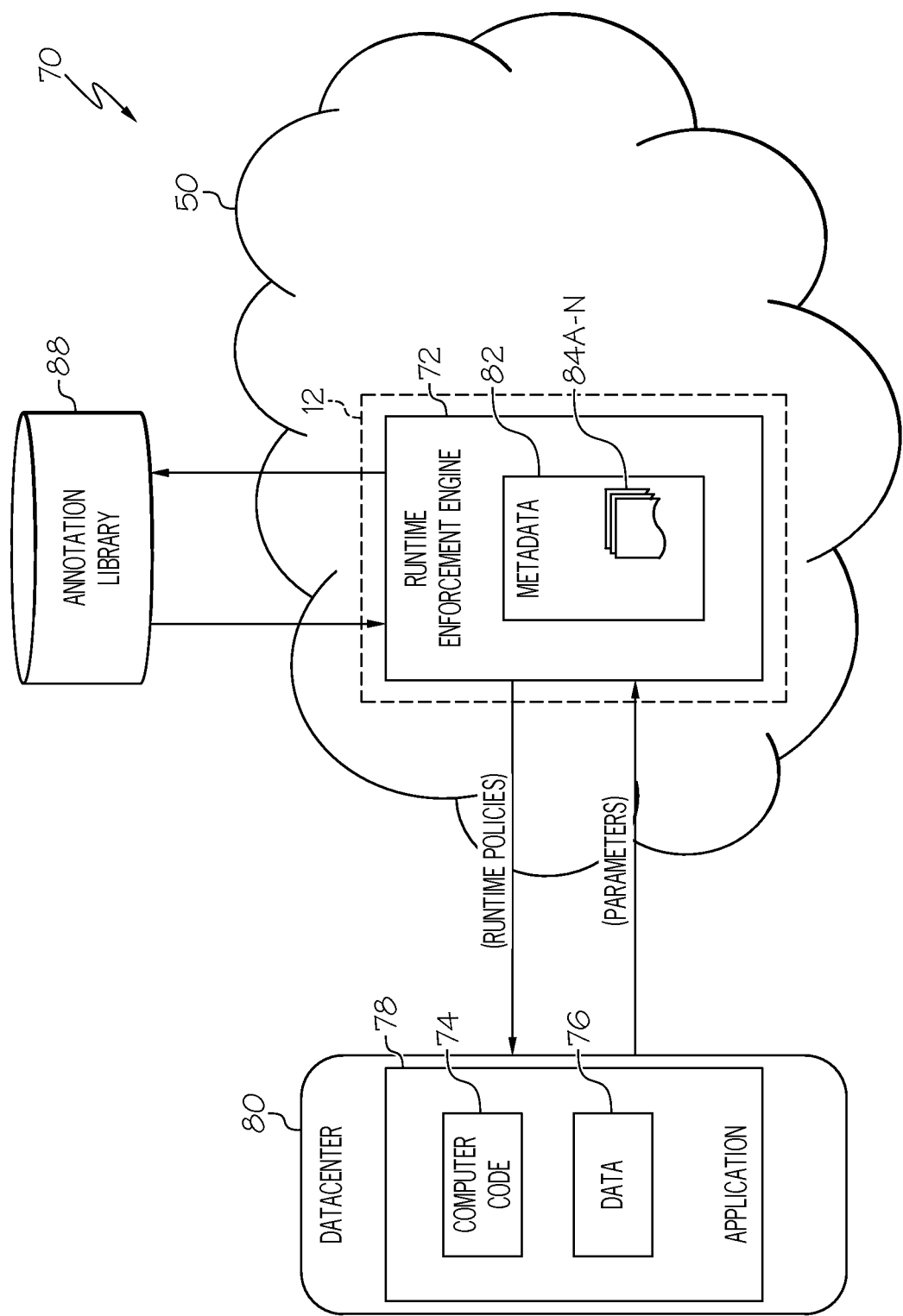
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 4 for illustrative purposes only. In the event the teachings recited herein are practiced in a networked computing environment 70, each client need not have a runtime enforcement system (hereinafter "system 72"). Rather, system 72 could be loaded on a server or server-capable device that communicates (e.g., wirelessly) with the clients to provide runtime enforcement therefore. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that enforces runtime policies in cloud computing environment 50. Such other system(s) have not been shown in FIG. 4 for brevity purposes.

Along these lines, system 72 may perform multiple functions similar to a general-purpose computer. Specifically, among other functions, system 72 may: annotate computer code 74 and data 76 of an application 78 (e.g., within datacenter 80) with metadata 82 defining a set of runtime policies 84A-N for executing the computer code 74 and data 76, wherein the annotations may be received from an annotation library 88; receive a request to run application 78; dynamically determine a set of parameters corresponding to the execution of computer code 74 and data 76 of application 78, wherein the set of parameters comprises a geographic location (e.g., determined via GPS) for executing computer code 74 and data 76; compare the set of parameters corresponding to the execution of computer code 74 and data 76 of application 78 with set of runtime policies 84A-N for executing computer code 74 and data 76; and enforce, at a runtime of application 78, set of runtime policies 84A-N for executing computer code 74 and data 76. In one embodiment, the set of parameters corresponding to the execution of computer code 74 and data 76 of application 78 comprises at least one of the following: time of execution, industry regulations, government regulations, and/or financial limits on computing power/resources.

System 72 is further configured to run application 78, or perform at least one of the following in the case that the set of parameters corresponding to the computer code 74 and data 76 of application 78 fails to satisfy set of runtime policies 84A-N for executing computer code 74 and data 76: prevent the running of application 78, and/or generate an alert (e.g., indicating the violation(s) and consequences for continuing).

Operation of system 72 can be described with respect to the following embodiment, in which a programmer or database developer creates a piece of code or data annotated with the following requirements:

1. code or data must run/be stored only in one data center;
2. code or data must run/be stored only in data centers in certain approved geographic locations;
3. code or data must have a minimal execution environment (64 bit, high memory); and
4. code or data must execute only at a fixed time, or have an expiration date.

Next, the developer compiles and signs the code to ensure the annotations are preserved, and distributes the code. A cloud provider or mobile device that has been verified to honor the annotations (e.g., via legal agreement or software/hardware enforcement) runs the application and enforces the rules specified by the annotations in regard to its current execution context. That is, the cloud provider or mobile device performs the following:

1. detects whether the annotation exists;
2. determines whether the application signature is valid;
3. determine whether it applies, per the current context of the runtime environment, and according to various parameters, such as:
  a. Geography
  b. Trade agreements
  c. Time Finally, the rules are enforced per the annotation(s) and applicability during runtime.

ILLUSTRATIVE EXAMPLES

This section will describe illustrative examples of different scenarios in which the embodiments of the present invention can be carried out. It is understood in advance that the teachings recited herein are not intended to be limited to any particular scenario.

Example 1

Banking Software in Worldwide Data Centers

In this example, software is written to handle financial transactions and runs in an enterprise IT environment that has taken advantage of worldwide cloud data centers, e.g., provided by IBM SmartCloud®, in order to provide a highly available environment for most company applications. In this example, the source code has been annotated only to allow it to handle sensitive transactions if it is running in a United States data center. Therefore, if the software code detects from its context that it is deployed into a data center located in a foreign country, it can either stop the transaction (s), which may prevent exposure to regulation or taxation, or warn the container that doing so might expose the user to penalties.

Example 2

Encryption Software on a Mobile Device

In this example, software is written to handle and implement encryption algorithms, and runs on a mobile device (e.g., a smart phone) in order to connect securely to enterprise Web services. The source code has been annotated only to allow it to encode data of the highest strength if it is running on a mobile device in the United States. If the software detects from its context that it is running on a mobile device located in a foreign country, it can either stop the transaction, e.g., to prevent exposure to legal penalties, and/or provide an alert warning the container that doing so might expose the user.

In this example, the mobile device is a location aware device, i.e., it can obtain location information including altitude, latitude and longitude when its location is changed, by analyzing signals provided by a GPS system. GPS technology is known in the art, and its detailed description is omitted herein.

In another embodiment, the mobile device is a location unaware device, i.e., it cannot obtain geographic information independently when its location changes. Instead, it may use various communication interfaces to obtain location information from other location aware devices, e.g., a base station, an access point, and the like. Here, the other electronic device can be a fixed device in one place and its location information is also fixed.

Example 3

Encoding Algorithms and IP Considerations

In this example, software is written to stream video and audio data to end users. The Web application that supports this feature can stream data in a variety of formats and quality levels. The source code has been annotated to allow high definition data to be streamed only in the United States. If the software detects from its context that it is running in a data center located in a foreign country, it can drop the quality of the stream, or use a different encoding.

Figure 5:
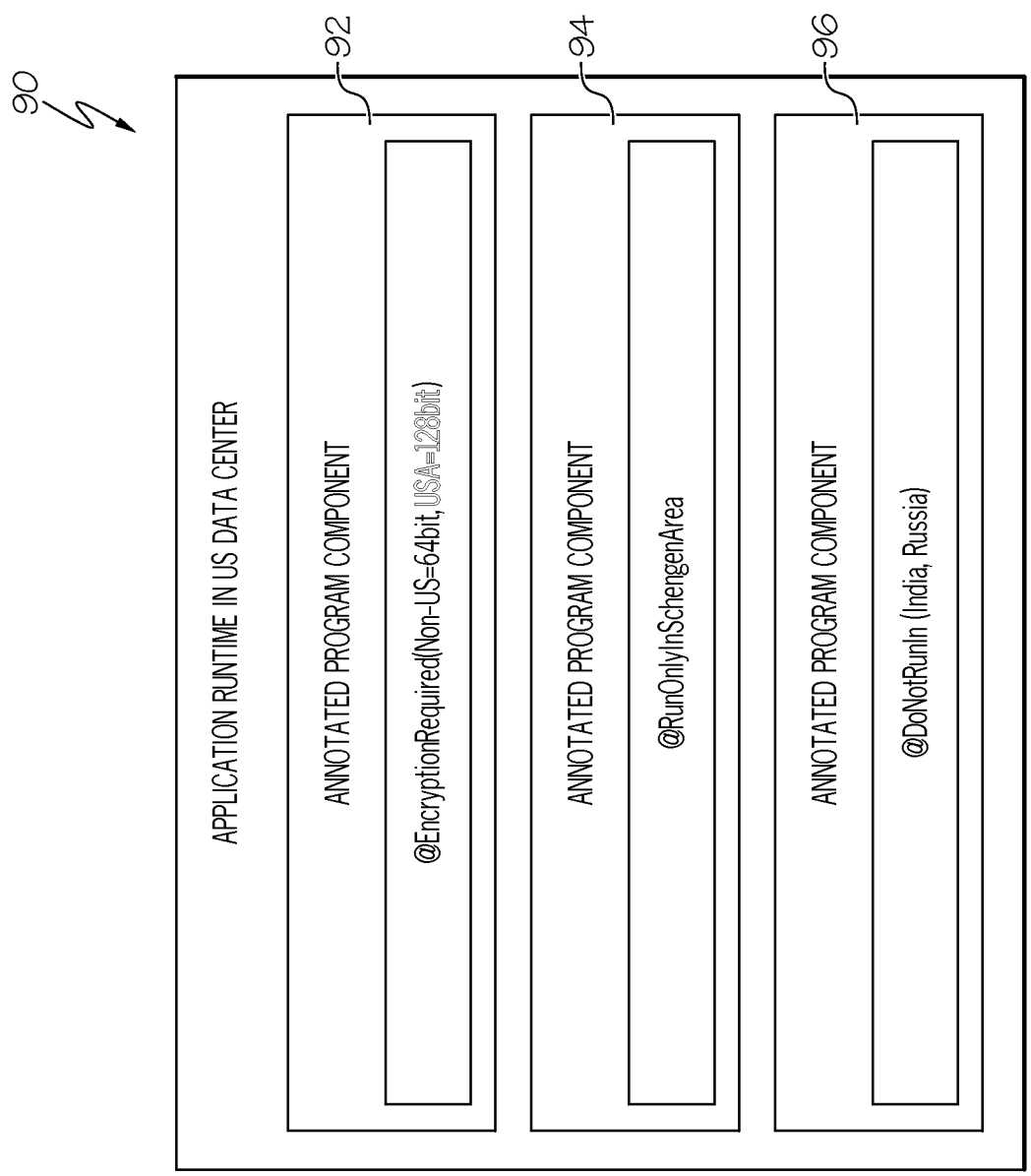
FIG. 5 depicts an implementation according to an embodiment of the present invention.

Referring now to FIG. 5, enforcement of a set of runtime policies in a cloud computing environment is shown in greater detail. It will be appreciated that although only a single annotation per component is shown for the sake of simplicity, any number of different annotations are possible. In this embodiment, an application 90 is shown as being run in a United States-based datacenter with three annotated program components, i.e., annotated program component 92, which requires encryption, annotated program component 94, which provides a first geographic restriction, and annotated program component 96, which provides a second geographic restriction. In this embodiment, only two out of the three components will run, i.e., annotated program components 92 and 96. Annotated program component 94 is not run because of the Schengen location-based restriction.

Figure 6:
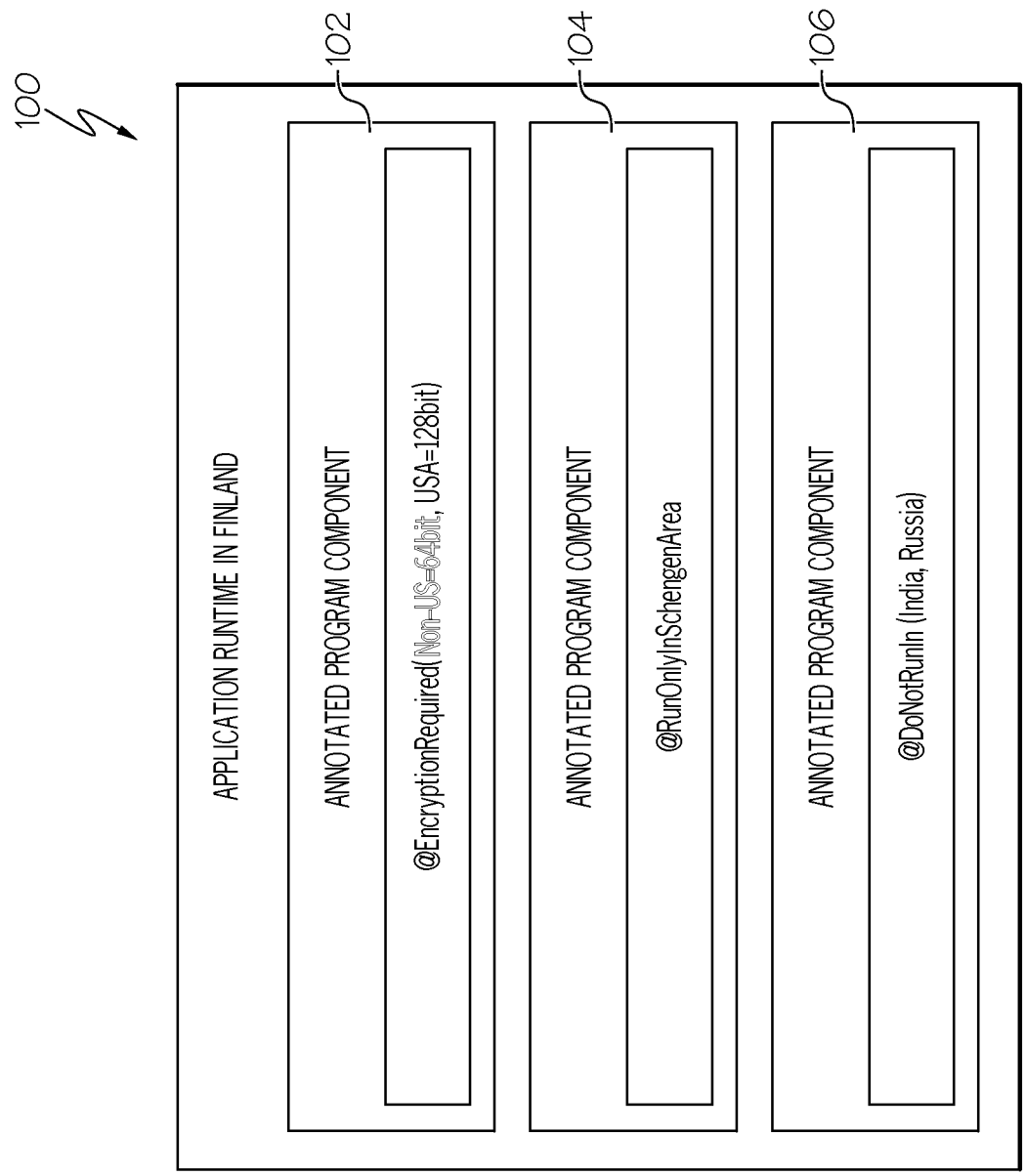
FIG. 6 depicts an implementation according to an embodiment of the present invention.

Referring now to FIG. 6, enforcement of another set of runtime policies in a cloud computing environment is shown in greater detail. Here, an application 100 is shown as being run in a datacenter located in Finland, the data center including three annotated program components, i.e., annotated program component 102, which requires encryption, annotated program component 104, which provides a first geographic restriction, and annotated program component 106, which provides a second geographic restriction. In this embodiment, all conditions are met and, therefore, all three components will run, i.e., annotated program components 102, 104, and 106.

Figure 7:
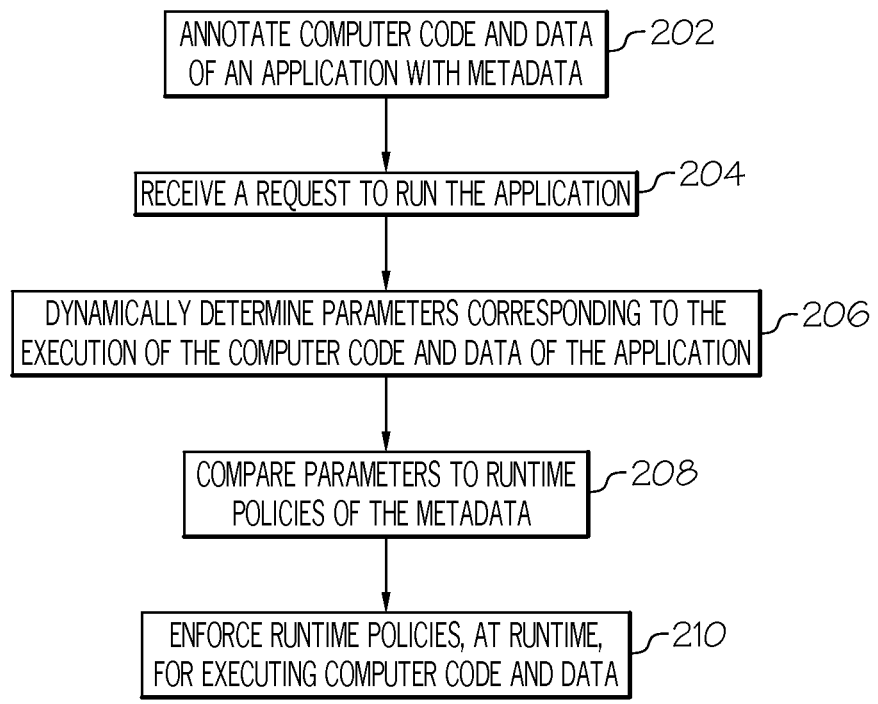
FIG. 7 depicts a method flow diagram according to an embodiment of the present invention.

Referring now to FIG. 7, a method flow 200 according to an embodiment of the present invention is shown. At 202, computer code and data of an application is annotated with metadata, the metadata defining a set of runtime policies for executing the computer code and data. At 204, a request to run the application is received. At 206, a set of parameters corresponding to the execution of the computer code and data of the application is dynamically determined. At 208, the set of parameters corresponding to the execution of the computer code and data of the application is compared with the set of runtime policies for executing the computer code and data. At 210, the set of runtime policies for executing the computer code and data is enforced at a runtime of the application.

Method flow 200 of FIG. 7 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as a command identification solution, it is understood that the invention further provides various alternative embodiments. For example, in one embodiment, the invention provides a computer-readable/useable medium that includes computer program code to enable a computer infrastructure to provide command identification functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide command identification functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for command identification. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for enforcing runtime policies in a networked computing environment, comprising:
    identifying an application having computer code comprising:
        a first portion of the computer code corresponding to a first component of the application, and
        a second portion of the computer code corresponding to a second component of the application;
    applying a first annotation to the first portion of the computer code, the first annotation comprising metadata defining a set of runtime policies for executing the first portion of computer code and data;
    applying a second annotation to the second portion of the computer code, the second annotation comprising metadata defining a set of runtime policies for executing the second portion of computer code and the data;
    receiving a request to run the application;
    dynamically determining a set of parameters corresponding to the execution of the computer code and the data of the application, wherein the set of parameters comprises a geographic location for executing the computer code and data;
    comparing the set of parameters corresponding to the execution of the computer code and the data of the application with the set of runtime policies for executing each of the first portion of computer code, the second portion of computer code, and the data; and
    enforcing, at a runtime of the application, the set of runtime policies for executing each of the first portion of the computer code, the second portion of the computer code, and the data by running the first portion of the application without running the second portion of the application.

2. The computer-implemented method of claim 1, further comprising performing at least one of the following: preventing running of the second portion of the application, and generating an alert relating to the second portion of the application.

3. The computer-implemented method of claim 1, the set of parameters corresponding to the execution of the computer code and data of the application further comprising at least one of: time, industry regulations, government regulations, and financial limits on computing power.

4. The computer-implemented method of claim 1, further comprising determining the geographic location for executing the computer code and data using a global positioning system.

5. The computer-implemented method of claim 1, the networked computing environment comprising a cloud computing environment.

6. The computer-implemented method of claim 5, further comprising receiving a set of annotations from an annotation library, each annotation of the library capable of operating in the cloud computing environment.

7. A system for enforcing runtime policies in a networked computing environment, comprising:
    a memory medium comprising instructions;
    a bus coupled to the memory medium; and
    a processor coupled to the bus that when executing the instructions causes the system to:
        identify an application having computer code comprising:
            a first portion of the computer code corresponding to a first component of the application, and
            a second portion of the computer code corresponding to a second component of the application;
        apply a first annotation to the first portion of the computer code, the first annotation comprising metadata defining a set of runtime policies for executing the first portion of computer code and data;
        apply a second annotation to the second portion of the computer code, the second annotation comprising metadata defining a set of runtime policies for executing the second portion of computer code and the data;
    receiving a request to run the application;
        dynamically determine a set of parameters corresponding to the execution of the computer code and the data of the application, wherein the set of parameters comprises a geographic location for executing the computer code and data;
        compare the set of parameters corresponding to the execution of the computer code and the data of the application with the set of runtime policies for executing each of the first portion of computer code, the second portion of computer code, and the data; and
        enforce, at a runtime of the application, the set of runtime policies for executing each of the first portion of the computer code, the second portion of the computer code, and the data by running the first portion of the application without running the second portion of the application.

8. The system of claim 7, the instructions further causing the system to perform at least one of the following in the case that the set of parameters corresponding to the computer code and data of the application fails to satisfy the set of runtime policies for executing the computer code and data: preventing running of the second portion of the application, and generating an alert relating to the second portion of the application.

9. The system of claim 7, the set of parameters corresponding to the execution of the computer code and data of the application further comprising at least one of: time, industry regulations, government regulations, and financial limits on computing power.

10. The system of claim 7, the instructions further causing the system to determine the geographic location for executing the computer code and data using a global positioning system.

11. The system of claim 7, the networked computing environment comprising a cloud computing environment.

12. The system of claim 11, the instructions further causing the system to receive a set of annotations from an annotation library, each annotation of the library capable of operating in the cloud computing environment.

13. A computer program product for enforcing runtime policies in a networked computing environment, the computer program product comprising a computer readable hardware storage device, and program instructions stored on the computer readable storage media, to:
- identify an application having computer code comprising:
  - a first portion of the computer code corresponding to a first component of the application, and
  - a second portion of the computer code corresponding to a second component of the application;
- apply a first annotation to the first portion of the computer code, the first annotation comprising metadata defining a set of runtime policies for executing the first portion of computer code and data;
- apply a second annotation to the second portion of the computer code, the second annotation comprising metadata defining a set of runtime policies for executing the second portion of computer code and the data;
- receive a request to run the application;
- dynamically determine a set of parameters corresponding to the execution of the computer code and the data of the application, wherein the set of parameters comprises a geographic location for executing the computer code and data;
- compare the set of parameters corresponding to the execution of the computer code and the data of the application with the set of runtime policies for executing each of the first portion of computer code, the second portion of computer code, and the data; and
- enforce, at a runtime of the application, the set of runtime policies for executing each of the first portion of the computer code, the second portion of the computer code, and the data by running the first portion of the application without running the second portion of the application.

14. The computer program product of claim 13, the computer readable hardware storage device further comprising instructions to perform at least one of the following in the case that the set of parameters corresponding to the computer code and data of the application fails to satisfy the set of runtime policies for executing the computer code and data: preventing running of the second portion of the application, and generating an alert relating to the second portion of the application.

15. The computer program product of claim 13, the set of parameters corresponding to the execution of the computer code and data of the application further comprising at least one of: time, industry regulations, government regulations, and financial limits on computing power.

16. The computer program product of claim 13, the networked computing environment comprising a cloud computing environment.

17. The system of claim 16, the computer readable hardware storage device further comprising instructions to receive a set of annotations from an annotation library, each annotation of the library capable of operating in the cloud computing environment.

* * * * *